(12) United States Patent
Li

(10) Patent No.: US 8,531,626 B2
(45) Date of Patent: Sep. 10, 2013

(54) OPTICAL ELEMENT, LIQUID CRYSTAL DISPLAY AND MANUFACTURE METHOD THEREOF

(75) Inventor: Wentao Li, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 315 days.

(21) Appl. No.: 12/982,034

(22) Filed: Dec. 30, 2010

(65) Prior Publication Data
US 2011/0157515 A1    Jun. 30, 2011

(30) Foreign Application Priority Data
Dec. 31, 2009 (CN) .......................... 2009 1 0217532

(51) Int. Cl.
*G02F 1/13357* (2006.01)
(52) U.S. Cl.
USPC .................................. 349/62; 349/64; 349/65
(58) Field of Classification Search
None
See application file for complete search history.

(56) References Cited

U.S. PATENT DOCUMENTS

| | | | | |
|---|---|---|---|---|
| 6,351,069 B1 * | 2/2002 | Lowery et al. | ................ | 313/512 |
| 7,052,152 B2 * | 5/2006 | Harbers et al. | .................. | 362/30 |
| 7,250,715 B2 * | 7/2007 | Mueller et al. | ................ | 313/485 |
| 7,446,343 B2 * | 11/2008 | Mueller et al. | .................. | 257/89 |
| 7,923,741 B1 * | 4/2011 | Zhai et al. | ........................ | 257/98 |
| 2006/0039152 A1 * | 2/2006 | Ito | .................. | 362/293 |
| 2006/0268579 A1 * | 11/2006 | Han et al. | ...................... | 362/629 |
| 2007/0228933 A1 * | 10/2007 | Maruyama et al. | ........... | 313/502 |
| 2010/0188611 A1 * | 7/2010 | Wang et al. | ..................... | 349/68 |

FOREIGN PATENT DOCUMENTS

| | | | |
|---|---|---|---|
| CN | 1521521 A | | 8/2004 |
| CN | 1869788 A | | 11/2006 |
| JP | 2003-84141 A | * | 3/2003 |
| JP | 2007-52994 A | * | 3/2007 |

* cited by examiner

*Primary Examiner* — Mike Stahl
(74) *Attorney, Agent, or Firm* — Ladas & Parry LLP

(57) ABSTRACT

An optical element adapted to be arranged between a white light source of a backlight and a color filter substrate of a liquid crystal display (LCD) in optical path, wherein the white light of the backlight is obtained by mixing blue light and yellow light by exciting yellow fluorescent powders with blue light, and wherein red particles are dispersed in the optical element.

15 Claims, 2 Drawing Sheets

OPTICAL ELEMENT, LIQUID CRYSTAL DISPLAY AND MANUFACTURE METHOD THEREOF

BACKGROUND

Embodiments of the present invention relate to an optical element of a liquid crystal display, a liquid crystal display and a manufacture method thereof.

With rapid development of liquid crystal displays (LCDs) and increasing requirements on energy efficiency, light emitting diodes (LEDs) have gradually replaced cold cathode fluorescent lamp (CCFL) as the light sources for a backlight of a LCD. The LCD employing LEDs as light sources of the backlight has characteristics of low energy consumption and long life period and also is environment-friendly. At present, three primary color (i.e., RGB) LEDs or white LEDs are mainly used for manufacturing a backlight. The backlight having three primary color LEDs has a higher cost in comparison with that having white LEDs. In addition, among various kinds of white LEDs, the white LEDs in each of which white light is obtained by mixing blue light from a blue LED and yellow light by exciting yellow fluorescence powders with blue light from the blue LED are most widely used. The blue LED and the yellow fluorescence powders are encapsulated in one package to form one white LED. In the spectrum of the white light obtained in the manner described above, the intensity of red light component is relatively weaker.

In a LCD, the light coming from the light source(s) of a backlight is transmitted to a color filter substrate through optical elements such as a light guide plate, a diffusion film, a prism film, a lower polarization plate, and the like. FIG. 1 shows a spectrum of the LCD that employs white LEDs, in each which white light is obtained by mixing blue light and yellow light by exciting yellow fluorescent powders with blue light, as a backlight. In FIG. 1, the wavelength range of the red light component is about 640~780 nm, the wavelength range of the green light component is about 505~525 nm, and the wavelength range of the blue light component is about 470~505 nm. As shown in FIG. 1, the red light component in the excited white light is insufficient after the white light passes through the backlight, because the intensity of the red light component in the white light obtained by exciting yellow fluorescent powders with blue light is relatively weaker as described above. Therefore, color shift occurs for the images displayed by the LCD with the light from the backlight.

SUMMARY

According to an embodiment, an optical element adapted to be arranged between a white light source of a backlight and a color filter substrate of a liquid crystal display (LCD) in optical path, wherein the white light of the backlight is obtained by mixing blue light and yellow light by exciting yellow fluorescent powders with blue light, and wherein red particles are dispersed in the optical element.

According to another embodiment, a liquid crystal display is provided. The liquid crystal display comprises a backlight having a white light source and a color filter substrate, wherein the white light of the backlight is obtained by mixing blue light and yellow light by exciting yellow fluorescent powders with blue light, and wherein the optical element according to claim 1 is arranged between the white light source and the color filter substrate in optical path.

According to still another embodiment, a method of manufacturing a liquid crystal display is provided. The method comprises: arranging an optical element dispersed with red particles therein between a white light source of a backlight, in which white light is obtained by mixing blue light and yellow light by exciting yellow fluorescent powders with blue light, and a color filter substrate of the liquid crystal display in optical path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The embodiments of the invention will become more fully understood from the detailed description given hereinafter and the accompanying drawings which are given by way of illustration only, and thus are not limitative of the present invention and wherein.

DETAILED DESCRIPTION

Figure 1:
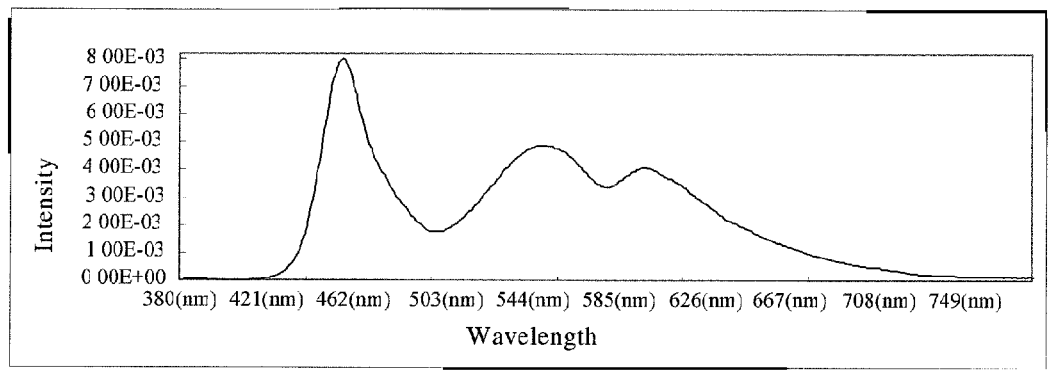
FIG. 1 shows a spectrum of a LCD that employs a white LED in which the white light is obtained by mixing blue light and yellow light by exciting the yellow fluorescent powder with blue light as backlight.

Hereinafter, some embodiments of the invention will be described in detail with reference to the accompanying drawings. It should be noted that, the following embodiments are described in an exemplary way but not in a limited way, and modifications, combinations and alterations can be made based on these embodiments without departing from the spirit and scope of the invention.

According to an embodiment of the invention, an optical element arranged between a white light source of a backlight and a color filter substrate of a liquid crystal display in optical path is provided. In addition, according to the embodiment of the invention, red particles are dispersed in the optical element.

In this embodiment, by distributing red particles into the optical element of the liquid crystal display, the transmittances of blue light component and green light component passing through the optical element are reduced. Thus, after the white light coming from the light source of the backlight passes through the optical element, the intensity proportions of the red light component, the green light component and the blue light component in the white light are changed, and specifically, the intensity proportion of the red light component is increased. Therefore, the white LEDs, in each of which white light is obtained by mixing blue light from a blue LED and yellow light by exciting yellow fluorescent powders with blue light from the blue LED or another blue LED, is employed for the light source of the backlight, the color shift of the displayed images can be alleviated or eliminated, and the display quality of the liquid crystal display can be improved accordingly. The blue LED and the yellow fluorescence powders are encapsulated in one package to form one white LED. "Yellow fluorescence powders" refer to the fluorescence powders that emit yellow light when excited with energy irradiation, such as UV light or blue light. In one embodiment, the yellow fluorescence powders can be excited by UV light from a UV LED in the same package as the blue LED and the yellow fluorescence powders.

In this embodiment, the red particles can be formed or manufactured with one or more organic or inorganic materials and by an ordinary process. By distributing the red particles into the optical element, the transmittances of the blue light component and the green light component passing through the optical element can be reduced.

In this embodiment, the red particles can be dispersed inside the optical element; alternatively, the red particles can be dispersed in the superficial layer of the optical element by penetrating. Where the red particles are dispersed in the superficial layer of the optical element in the penetrating way, red pigment ink can be printed on the surface of the optical element to form a penetration layer of red particles.

In this embodiment, the optical element may be an optical film, such as a diffusion film, a prism film, and the like, or the optical element may be a light guide plate or a lower polarization plate in a LCD. The optical element is provided, in optical path, between the white light source and the color filter substrate in the LCD.

In a typical LCD, one or more white light sources are provided facing one or two side surfaces of a light guide plate or under the light guide plate; one or more optical films, such as diffusion film, prism film, and the like, are provided over the light guide plate; and a lower polarization plate is provided on the bottom surface of the liquid crystal panel formed by assembling together an array substrate and a color filter substrate and over the backlight including the light guide plate and the optical films. The light emitted from the white light sources passes in order the light guide plate, the optical films, the lower polarization plate, and color filter substrate in optical path.

Figure 2:
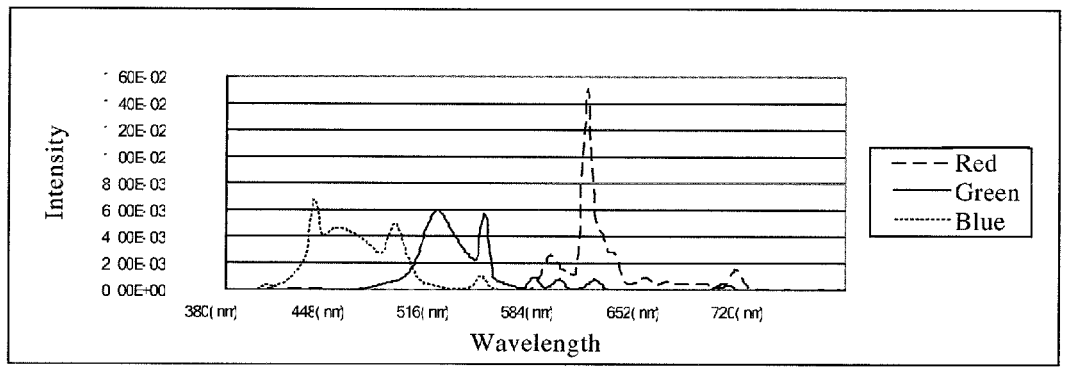
FIG. 2 shows a spectrum of a LCD with an extra large intensity proportion of red light after red particles are dispersed in a light guide plate.
Figure 3:
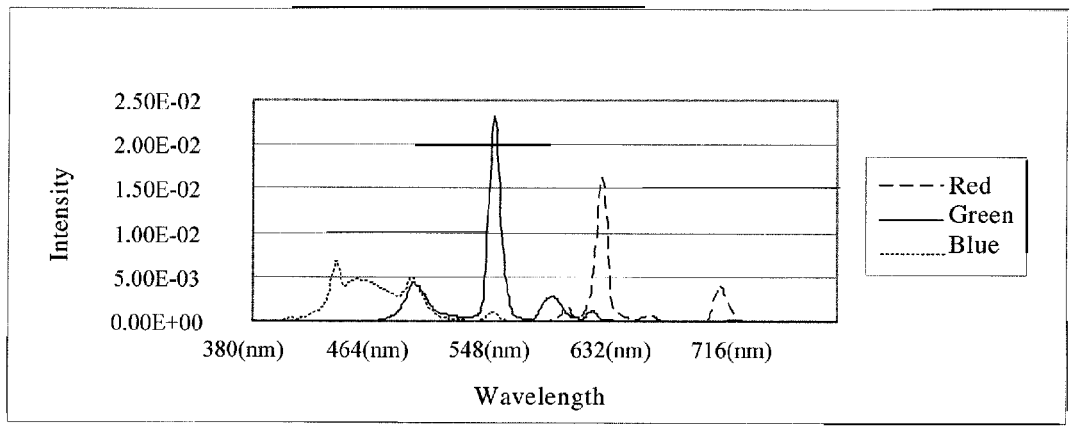
FIG. 3 shows a spectrum of the LCD after red particles are dispersed in the light guide plate according to the embodiment.

If the optical element is a light guide plate, the red particles can be dispersed inside the light guide plate. A stimulation for example with a currently available software shows that the color shift cannot be substantially eliminated when the diameters of the red particles are smaller than 0.1 μm and the particle density is smaller than 1.01 g/cm$^3$. If the particles are too large, for example, the diameters of the particles are larger than 0.5 μm and the particle density is larger than 1.67 g/cm$^3$, the light transmittance of the light guide plate is decreased from 94.3% to 76% and the brightness of the LCD is decreased by about 20%. That is, the transmittances of the green light component and the blue light component passing through the light guide plate is overly decreased, thus the brightness of the LCD is overly decreased and the displayed image of the LCD is shifted to be relatively red. Therefore, as shown in FIG. 2, the intensity proportion of the red light component is large, and in this case, the display quality is degraded as well. In addition, if the diameters of the red particles are in the range of 0.1~0.3 μm and the particle density is 1.2~1.52 g/cm$^3$, the light transmittance of the light guide plate is 90.5% and the brightness of the LCD is decreased only by 3.3~5.4%. That is, the brightness of the LCD is not significantly decreased. In addition, in this case, as shown in FIG. 3, the appropriate adjustment of the intensity proportions of the red light component, the green light component and the blue light component can be obtained. Thus, the color shift can be effectively alleviated or eliminated and the display quality can be improved accordingly.

In addition, according to another embodiment of the invention, a light guide plate can be manufactured by the following steps.

Step 101 of adding red particles into the molten raw material of the light guide plate and stirring; and Step 102 of injection-molding the raw material of the light guide plate which has been stirred.

Since only a step of adding red particles into and then stirring the molten raw materials for the light guide plate is inserted into the normal manufacture process of the light guide plate, the above-described manufacture process of the light guide plate according to the embodiment of the invention can be easily conducted. The process of stirring is conducted to uniformly spread the red particles within the molten materials. With the light guide plate manufactured in the above method, the transmittances of the blue light component and the green light component through the light guide plate are reduced and the intensity proportion of the red light component in the excited white light is increased relatively. The raw material of the light guide plate may be PMMA (polymethyl methacrylate). In addition, the red particles may be added at the initial stage of manufacturing the motherboard of the PMMA light guide plate. In this case, an appropriate amount of red particles are firstly added into the molten PMMA material and stirred, and the amount of the red particles is selected depending on the desired chromaticity; then the PMMA material dispersed with the red particles is injection-molded and then cured to form the motherboard of the light guide plate; finally the motherboard is sliced or cut into a plurality of light guide plates, for example, in the shape of rectangle.

Another example of the optical element in the embodiment may be a lower polarization plate, and the red particles may be dispersed into the lower polarization plate in the similar manner to the light guide plate. By distributing the red particles into the lower polarization plate, the transmittances of the blue light component and the green light component passing through the lower polarization plate are reduced, and the intensity proportion of the red light component in the white light is increased. Thus, the color shift can be effectively alleviated or eliminated.

Further another example of the optical element in the embodiment may be an optical film, such as a diffusion film, a prism film and the like, which is arranged between the backlight and the color filter substrate in optical path in a LCD. In addition, the red particles may be dispersed inside the optical film, or the red particles may be dispersed in a coating layer applied on the optical film with penetration of the red pigment. Specifically, when the red particles are added into the diffusion film, the red particles may be dispersed in the coating layer applied on the surface of the diffusion film by penetrating, and the penetration layer of the red particles may be 30~50 μm in thickness. By distributing the red particles into the above optical film, the transmittances of the blue light component and the green light component passing through the optical film are reduced, and the intensity proportions of the red light component, the green light component and the blue light component in the white light are adjusted. Thus, the color shift can be effectively alleviated or eliminated. In addition, the red pigment ink may be printed only on one diffusion film (e.g., prism film) or several diffusion films for the backlight to increase the intensity proportion of the red light component in the excited white light and thus alleviate or eliminate the color shift.

Figure 4:
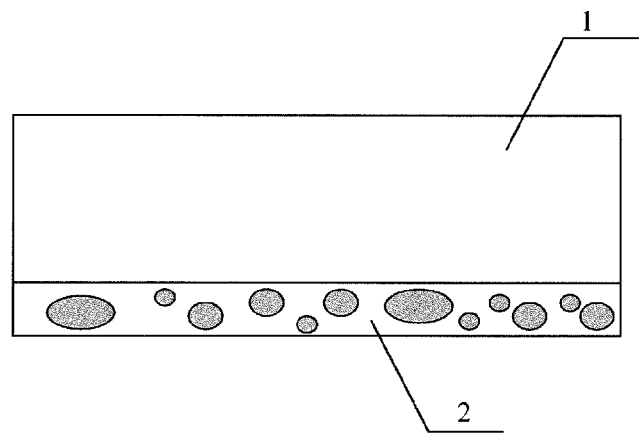
FIG. 4 shows a schematic view showing a diffusion film with penetration of red pigment ink according to the embodiment.
Figure 5:
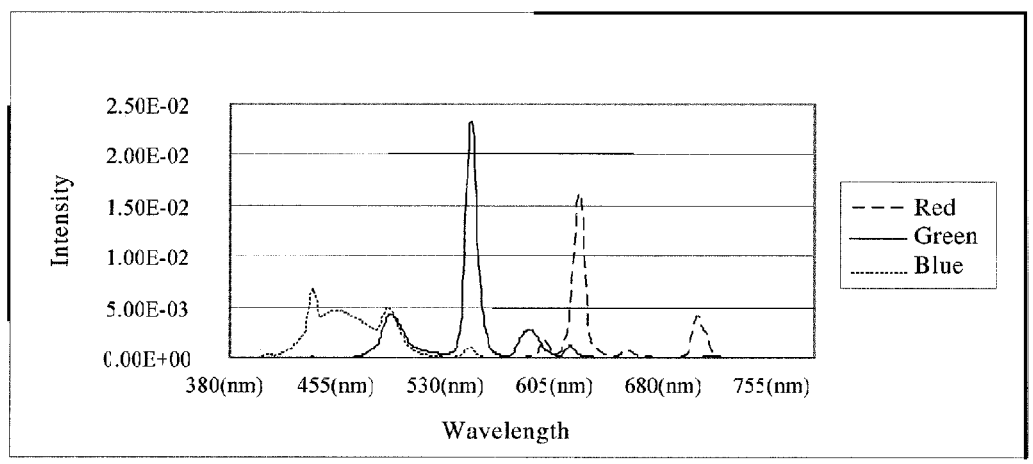
FIG. 5 shows a spectrum of the LCD after red particles are dispersed in the diffusion film according to the embodiment.

As shown in FIG. 4, the red particles can penetrate into the coating layer applied on one side of the diffusion film 1 to form a penetration layer of red particles. In this embodiment, the thickness of the base body of the optical film (for example, formed of polyethylene terephthalate (PET)) is 0.21 mm, and the thickness of the coating layer (i.e., the thickness of the penetration layer) is 46 μm. Another stimulation for example with the optical software shows that the stimulation result is substantially not changed when the penetration thickness of the red pigment ink is smaller than 30 μm in comparison with the case where no red particles are added, and at this time, the haze is increased from 94.3% to 95.7% and the light transmittance is decreased from 73.6% to 71.9%. In addition, when the penetration thickness of the red pigment ink (i.e., the thickness of the penetration layer of the red particles) is 30~50 μm, the intensity proportion of the red light component in the white light is increased, and the color shift is effectively alleviated or eliminated. In this case, the haze is increased from 94.3% to 97.5%, the light transmittance is decreased from 73.6% to 68.4%, and the spectrum of the light emitting from the LCD is specifically shown in FIG. 5. In addition, when the penetration thickness of the red pigment ink (i.e., the thickness of the penetration layer of the red particles) is larger than 55 μm, the haze is 98.9% and the light transmittance is 43.7%, and in this case, the diffusion film cannot be used any more due to its low light transmittance.

In addition, according to another embodiment of the invention, the above described optical film of the LCD may be manufactured by the following steps.

Step 201 of forming the coating layer on the base body of the optical film by a rolling process; and Step 202 of printing the red pigment ink onto the surface of the coating layer by a printing process to form the penetration layer of the red particles in the coating layer.

According to this embodiment, during the manufacture process of the optical film, such as a diffusion film, a printing process is employed after the coating layer is formed on the base body of the optical film (for example, formed by PET) by a rolling process, that is, the red pigment ink is printed on the surface of the coating layer. Since the red pigment ink can penetrate into the coating layer, the penetration layer of the red particles with a certain thickness is formed in the coating layer. Then, after a period of dying and curing, the optical film having red particles added therein is obtained. Therefore, the above manufacture process can be easily completed. By adding the red particles into the optical film such as a diffusion film, the transmittances of the blue light component and the green light component passing through the optical film are reduced, and the intensity proportions of the red light component, the green light component and the blue light component in the white light are adjusted. Thus, the intensity proportion of the red light component can be increased, and the color shift can be effectively alleviated or eliminated.

In addition, in the step 201 of forming the coating layer on the base body of the optical film by a rolling process, the red pigment ink or the red particles may be simultaneously made penetrate into the coating layer to form the penetration layer of the red particles with a certain thickness. Thus, the color shift can be effectively alleviated or eliminated as well.

In addition, the optical element in the embodiment may be a prism film, and the red particles may be dispersed into the prism film in the similar manner to the above diffusion film. In the case, the color shift can be effectively alleviated or eliminated as well.

In addition, according to another embodiment of the invention, a liquid crystal display is provided. The liquid crystal display comprises a backlight using white light sources and a color filter substrate in addition to other parts such as array substrate, liquid crystal layer, and so on. In addition, the liquid crystal display further comprises an optical element arranged between the white light sources and the color filter substrate in optical path. The white light sources may comprise white light LEDs or the like, in the white light emitted from which the red light component is relatively weaker compared with the yellow light component and the blue light component. That is, here the white light source is not limited to white light LED.

In this embodiment, red particles are uniformly dispersed in the optical element. In addition, the optical element may be a light guide plate, a lower polarization plate, or an optical film, such as a diffusion film, a prism film and the like. With the liquid crystal display of this embodiment, the color shift of the image displayed on the liquid crystal display can be effectively alleviated or eliminated.

In the above embodiments of the invention, the optical element and the liquid crystal display provided with the optical element in optical path are provided. By distributing the red particles into the optical element, the transmittances of the blue light component and the green light component passing through the optical element are reduced, the intensity proportions of the red light component, the green light component and the blue light component in the white light are adjusted, and the intensity proportion of the red light in the white light is increased. After the white light adjusted by the above optical element is transmitted through the color filter substrate, the emitted light becomes more uniform and more suitable to be recognized by the human eyes. Therefore, the color shift occurring in the case where the white LED, in which white light is obtained by mixing blue light and yellow light by exciting yellow fluorescent powders with blue light, is used as the light sources of the backlight of the LCD can be effectively alleviated or eliminated. In addition, according to the embodiments of the invention, the power of the backlight may be increased (for example, the number of the LEDs may be increased) to compensate the brightness loss resulting from the reduction of the transmittances of the blue light component and the green light component, and thus the brightness of the liquid crystal display can be maintained.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention. The invention is not limited to the described material and process.

What is claimed is:

1. An optical element adapted to be arranged between a white light source of a backlight and a color filter substrate of a liquid crystal display (LCD) in optical path, wherein the white light of the backlight is obtained by mixing blue light and yellow light by exciting yellow fluorescent powders with blue light, and wherein red particles are dispersed in the optical element, the diameters of the red particles are in the range of 0.1~0.3 μm and the density of the red particles is in the range of 1.23~1.52 g/cm$^3$.

2. The optical element according to claim 1, wherein the red particles are dispersed inside the optical element or the red particles are dispersed in a superficial layer of the optical element by penetrating.

3. The optical element according to claim 2, wherein the optical element comprises a light guide plate, an optical film or a lower polarization plate.

4. The optical element according to claim 3, wherein the optical film comprises a diffusion film or a prism film.

5. The optical element according to claim 3, wherein the red particles are provided inside the light guide plate.

6. The optical element according to claim 4, wherein the red particles are dispersed in a coating layer on the diffusion film by penetrating, and a thickness of a penetration layer of the red particles is in the range of 30~50 μm.

7. The optical element according to claim 1, wherein the red particles are formed of red pigment.

8. A liquid crystal display comprising a backlight having a white light source and a color filter substrate, wherein the white light of the backlight is obtained by mixing blue light and yellow light by exciting yellow fluorescent powders with blue light, and wherein the optical element according to claim 1 is arranged between the white light source and the color filter substrate in optical path.

9. A method of manufacturing a liquid crystal display, comprising:
arranging an optical element dispersed with red particles therein between a white light source of a backlight, in which white light is obtained by mixing blue light and yellow light by exciting yellow fluorescent powders with blue light, and a color filter substrate of the liquid crystal display in optical path,
wherein the diameters of the red particles are in the range of 0.1~0.3 μm and the density of the red particles is in the range of 1.23~1.52 g/cm$^3$.

10. The method according to claim 9, wherein the optical element comprises a light guide plate, an optical film or a lower polarization plate.

11. The method according to claim 10, wherein the optical film comprises a diffusion film or a prism film.

12. The method according to claim 10, further comprising:
adding the red particles into and stirring a molten raw material of the light guide plate; and
injection-molding the raw material of the light guide plate which has been stirred.

13. The method according to claim 10, further comprising:
forming a coating layer on a base body of the optical film by a rolling process; and
printing a red pigment ink onto a surface of the coating layer by a printing process to form a penetration layer of the red particles in the coating layer.

14. The method according to claim 10, wherein a thickness of a penetration layer of the red particles is in the range of 30~50 μm.

15. The method according to claim 9, wherein the red particles are formed of red pigment.

* * * * *